US012546482B2

(12) United States Patent
Collene et al.

(10) Patent No.: US 12,546,482 B2
(45) Date of Patent: Feb. 10, 2026

(54) SLOW OPEN HINGE ASSEMBLY

(71) Applicant: Mansfield Engineered Components, LLC, Mansfield, OH (US)

(72) Inventors: James J. Collene, Bucyrus, OH (US); Brian S. White, Galion, OH (US)

(73) Assignee: Mansfield Engineered Components, LLC, Mansfield, OH (US)

( * ) Notice: Subject to any disclaimer, the term of this patent is extended or adjusted under 35 U.S.C. 154(b) by 0 days.

(21) Appl. No.: 18/917,950

(22) Filed: Oct. 16, 2024

(65) Prior Publication Data

US 2025/0123005 A1 Apr. 17, 2025

Related U.S. Application Data

(60) Provisional application No. 63/544,617, filed on Oct. 17, 2023.

(51) Int. Cl.

| | |
|---|---|
| ***F24C 15/02*** | (2006.01) |
| ***E05F 1/12*** | (2006.01) |
| ***E05F 3/20*** | (2006.01) |

(52) U.S. Cl.

CPC .......... *F24C 15/023* (2013.01); *E05F 1/1261* (2013.01); *E05F 3/20* (2013.01); *E05Y 2201/212* (2013.01); *E05Y 2201/254* (2013.01); *E05Y 2201/624* (2013.01); *E05Y 2900/308* (2013.01)

(58) Field of Classification Search

CPC ......... F24C 15/023; E05F 3/20; E05F 1/1246; E05F 1/1253; E05F 1/1261; E05F 1/1269; E05F 1/1276; E05F 1/1292; E05F 5/02

See application file for complete search history.

(56) References Cited

U.S. PATENT DOCUMENTS

| | | | | |
|---|---|---|---|---|
| 1,228,042 | A | 5/1917 | O'Dowd | |
| 1,253,376 | A | 1/1918 | Hick | |
| 2,731,011 | A * | 1/1956 | Maier | F24C 15/023 126/194 |
| 3,712,287 | A | 1/1973 | Summers, Jr. | |
| 5,269,043 | A | 12/1993 | Yang | |

(Continued)

FOREIGN PATENT DOCUMENTS

| | | | |
|---|---|---|---|
| CN | 207686490 | U | 8/2018 |
| CN | 207944837 | U | 10/2018 |

(Continued)

*Primary Examiner* — Jeffrey O'Brien

(74) *Attorney, Agent, or Firm* — Lippes Mathias LLP

(57) ABSTRACT

A slow open hinge assembly for an associated appliance door includes an arm and a channel including a first end that is pivotally connected to the arm at a first location for pivoting about a first pivot axis. A slide link includes an inner end that is pivotally connected to the arm at a second location for pivoting about a second pivot axis that is offset from the first pivot axis. A fluid damped spring rod assembly includes a cylinder body supported on the channel and includes a spring-biased piston rod assembly engaged with the slide link. A control spring assembly can be connected to the channel and includes a reciprocally movable spring rod assembly including a follower, wherein the follower is engaged with a cam profile defined by a contoured edge of the arm for some but not all angular positions of the channel relative to the arm.

18 Claims, 12 Drawing Sheets

(56) References Cited

U.S. PATENT DOCUMENTS

| | | | |
|---|---|---|---|
| 6,397,836 | B1 | 6/2002 | Pelletier et al. |
| 6,789,293 | B2 * | 9/2004 | Habegger ................. E05F 5/10 16/374 |
| 6,845,545 | B2 | 1/2005 | Han et al. |
| 7,134,169 | B2 * | 11/2006 | Habegger ............. F24C 15/023 16/297 |
| 7,610,656 | B2 | 11/2009 | Vanini |
| 7,676,888 | B2 * | 3/2010 | Vanini ................... F24C 15/023 16/277 |
| 8,533,914 | B2 | 9/2013 | Vanini |
| 8,544,971 | B2 | 10/2013 | Stocker |
| 8,683,653 | B2 | 4/2014 | Bettinzoli |
| 8,806,718 | B2 | 8/2014 | Elkasevic |
| 8,806,719 | B2 | 8/2014 | Kleeman et al. |
| 8,833,877 | B2 | 9/2014 | Elkasevic et al. |
| 8,925,542 | B2 * | 1/2015 | White ................... F24C 15/023 126/190 |
| 9,074,400 | B2 * | 7/2015 | Mirshekari ............... E05F 3/14 |
| 9,080,365 | B2 * | 7/2015 | Collene ..................... E05F 5/02 |
| 9,121,211 | B1 | 9/2015 | White et al. |
| 9,181,741 | B2 | 11/2015 | Bettinzoli |
| 9,995,075 | B2 | 6/2018 | Vanini |
| 10,082,298 | B2 * | 9/2018 | White ....................... E05F 3/20 |
| 10,145,157 | B2 * | 12/2018 | White ....................... E05F 5/06 |
| 10,704,307 | B1 * | 7/2020 | Collene ................... E05D 11/10 |
| 10,794,102 | B2 * | 10/2020 | Vanini ....................... E05F 1/12 |
| 10,890,334 | B2 * | 1/2021 | White ................... E05F 1/1261 |
| 11,187,021 | B2 * | 11/2021 | Gherardi ............... E05F 1/1261 |
| 11,377,890 | B1 * | 7/2022 | Gore ......................... E05D 7/10 |
| 11,391,078 | B2 * | 7/2022 | Collene ................... D06F 39/14 |
| 11,624,223 | B2 * | 4/2023 | White ................... E05D 7/0415 16/242 |
| 2006/0032019 | A1 | 2/2006 | Kistner et al. |
| 2007/0283532 | A1 | 12/2007 | Vanini |
| 2008/0201907 | A1 | 8/2008 | Vanini |
| 2008/0289144 | A1 | 11/2008 | Vanini |
| 2010/0148646 | A1 | 6/2010 | Bettinzoli |
| 2010/0281650 | A1 | 11/2010 | Kleemann et al. |
| 2011/0017191 | A1 | 1/2011 | White |
| 2011/0068671 | A1 | 3/2011 | Vanini |
| 2011/0113816 | A1 | 5/2011 | Stocker |
| 2011/0146654 | A1 | 6/2011 | Basavalingappa Mudbasal et al. |
| 2011/0146655 | A1 | 6/2011 | Basavalingappa Mudbasal et al. |
| 2011/0148262 | A1 | 6/2011 | Basavalingappa Mudbasal et al. |
| 2012/0067333 | A1 | 3/2012 | Mirshekari et al. |
| 2013/0291853 | A1 * | 11/2013 | Braden ................. E05D 7/0423 312/326 |
| 2013/0300273 | A1 | 11/2013 | Elkasevic et al. |
| 2013/0307392 | A1 | 11/2013 | Elkasevic et al. |
| 2013/0312217 | A1 | 11/2013 | Kleeman et al. |
| 2013/0312220 | A1 | 11/2013 | Elkasevic |
| 2013/0312221 | A1 | 11/2013 | Elkasevic |
| 2014/0208542 | A1 | 7/2014 | White |
| 2014/0345082 | A1 | 11/2014 | Collene |
| 2017/0059176 | A1 | 3/2017 | SirLouis |
| 2019/0316380 | A1 | 10/2019 | Kim et al. |
| 2019/0316781 | A1 | 10/2019 | Kim et al. |
| 2020/0263467 | A1 | 8/2020 | White |

FOREIGN PATENT DOCUMENTS

| | | | |
|---|---|---|---|
| CN | 110259308 | A | 9/2019 |
| CN | 210685670 | U | 6/2020 |
| CN | 213683638 | U | 7/2021 |
| DE | 29 39 727 | A1 | 4/1981 |
| DE | 10 2005 045 365 | A1 | 3/2007 |
| DE | 10 2007 029 696 | A1 | 1/2009 |
| EP | 1 884 181 | A1 | 2/2008 |
| EP | 1995524 | A2 | 11/2008 |
| EP | 2 284 344 | A2 | 2/2011 |
| EP | 2 664 737 | A2 | 11/2013 |
| EP | 2 977 537 | A1 | 1/2016 |
| EP | 3293332 | A1 | 3/2018 |
| EP | 3 546 688 | A1 | 10/2019 |
| EP | 3748235 | A1 | 12/2020 |
| TR | 201604159 | U | 7/2016 |
| WO | WO 2009/030618 | A1 | 3/2009 |
| WO | WO 2013133774 | A1 | 9/2013 |
| WO | WO 2015/086470 | A1 | 6/2015 |
| WO | WO 2021010904 | A1 | 1/2021 |

* cited by examiner

SLOW OPEN HINGE ASSEMBLY

CROSS-REFERENCE TO RELATED APPLICATION

This application claims priority from and benefit of the filing date of U.S. provisional application Ser. No. 63/544,617 filed Oct. 17, 2023, and the entire disclosure of said provisional application is hereby expressly incorporated by reference into the present application.

BACKGROUND

Hinge assemblies for ovens and other appliances that provide slow open and/or slow close characteristics are generally known. Notwithstanding the success and popularity of known designs, a need has been identified for a new and improved hinge assembly that provides effective slow open characteristics while being durable, cost-effective, and that allows for the slow open range of motion to be conveniently established during design and manufacture of the hinge, while also providing desired controlled closing characteristics.

SUMMARY

In accordance with one aspect of the present development, a slow open hinge assembly for an associated appliance door includes an arm, a channel with a first end that is pivotally connected at a first end to the arm at a first location for pivoting about a first pivot axis, a slide link including an inner end that is pivotally connected to the arm at a second location for pivoting about a second pivot axis that is offset from the first pivot axis, a fluid damped spring rod assembly including a cylinder body supported on the channel and including a spring-biased piston rod assembly engaged with the slide link.

In accordance with another aspect of the present development, the slow open hinge assembly further includes a control spring assembly connected to the channel and including a reciprocally movable spring rod assembly including a follower, wherein the follower is engaged with a cam profile defined by a contoured edge of the arm for some but not all angular positions of said channel relative to said arm.

In accordance with a further aspect of the present development, a hinge assembly for an associated appliance door includes an arm and a channel including an inner end pivotally connected to the arm and an outer end spaced from the inner end of the channel. The channel and arm are adapted to pivot relative to each other about a first pivot axis between a first position that corresponds to a closed position of the associated appliance door and a second position that corresponds to an opened position of the associated appliance door, wherein the channel and arm pivot relative to each other through upper and lower intermediate positions located between the first and second positions when the channel and arm pivot between the first and second positions. A slide link is located adjacent the channel and includes a slide link inner end and a slide link outer end spaced from said slide link inner end, said slide link inner end is pivotally connected to the arm at a location that is offset from said first pivot axis such that relative pivoting movement between the channel and the arm about the main pivot axis results in movement of the slide link relative to the channel. A fluid damped spring rod assembly is operably engaged with the channel and comprising a spring-biased piston rod assembly operably engaged with the slide link, wherein the fluid damped spring rod assembly damps movement of the channel from the lower intermediate position toward the second position.

In accordance with a further aspect, the hinge assembly includes a control spring assembly connected to the channel and including a reciprocally movable control spring rod assembly including a follower, wherein the follower is engaged with a cam profile defined by a contoured edge of the arm for some but not all angular positions of the channel relative to the arm.

DETAILED DESCRIPTION OF THE INVENTION

Figure 1:
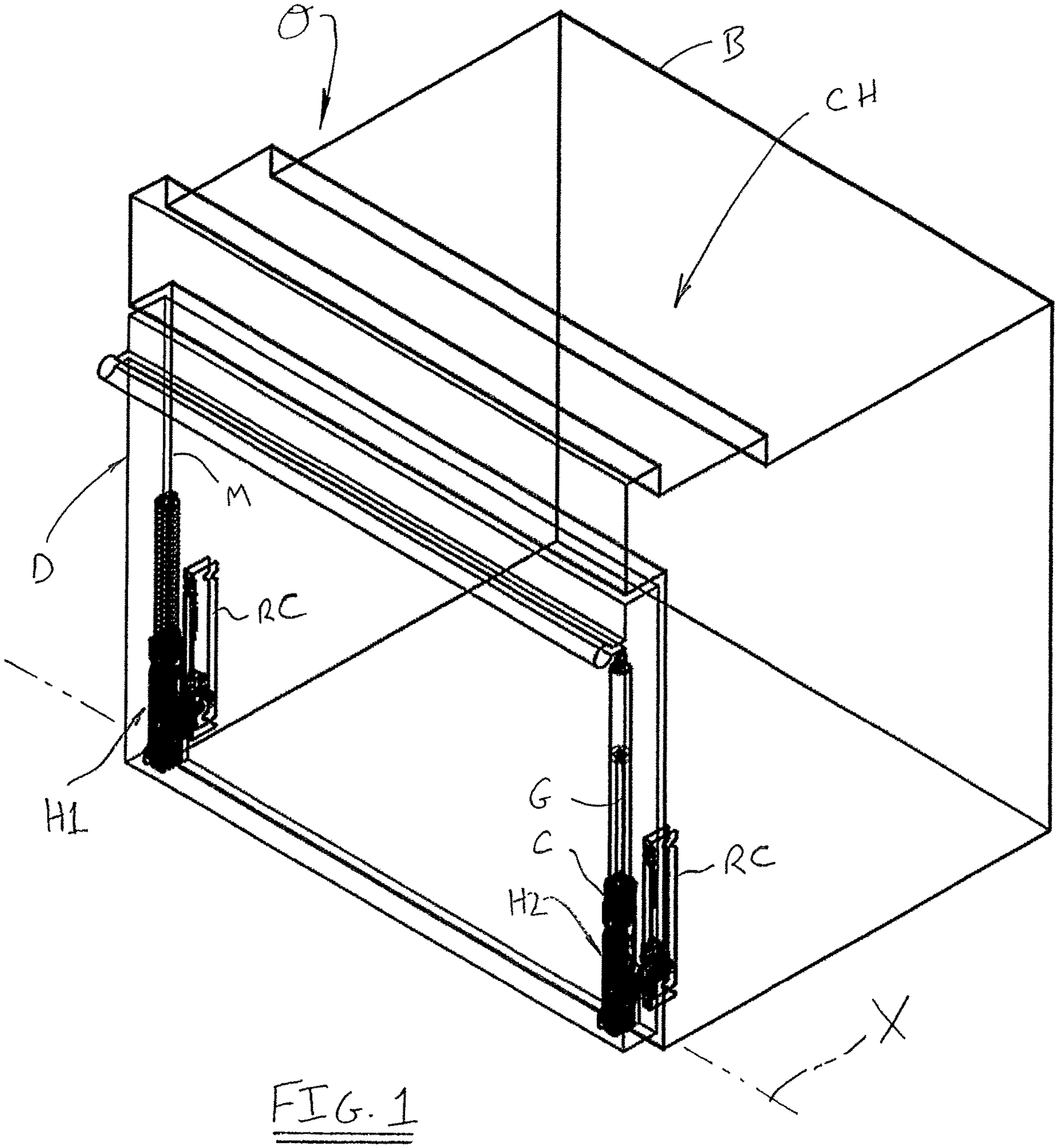
FIG. 1 provides an isometric view of an oven including first and second hinge assemblies, wherein at least one of the hinge assemblies is a slow open hinge assembly provided in accordance with an embodiment of the present development.

FIG. 1 provides an isometric view of an oven O including a body B in which a cooking chamber CH is defined. The oven O comprises a door D for selectively closing an open mouth M of the cooking chamber. The door D is pivotally connected to the body B and pivots about a first pivot axis X (typically the pivot axis X is horizontally oriented) between a first or closed position (as shown) in which the door closes the mouth M of the cooking chamber and a second or fully opened position in which the door D is moved away from the mouth M of the cooking chamber CH to provide access to the cooking chamber CH. The door D typically moves from its illustrated closed position to a fully opened position where it is transversely oriented at an angle of approximately 85-90 degrees relative to the body B to allow a user to place food into and remove food from the cooking chamber CH.

The door D is pivotally connected to the body B by first and second hinges or hinge assemblies H1, H2 located respectively adjacent opposite first and second lateral sides of the mouth M and oven body B. At least one of the hinge assemblies (the second hinge assembly H2 in the illustrated example) is provided in accordance with the present development as described herein. Alternatively, the door D and hinge assemblies H1, H2 can be arranged such that the door pivots relative to the body B about a vertical axis or other axis oriented 90 degrees from or otherwise transverse relative the illustrated horizontal pivot axis X to provide a side-swing door D. The oven O can alternatively be structured and provided as any other appliance such as a clothes washer or dryer, or other appliance, in which case the cooking chamber CH can be more generally referred to as a chamber or processing chamber.

FIG. 1 illustrates an embodiment of the present development in which the appliance door D comprises first and second hinge assemblies H1, H2, wherein the first hinge assemblies H1 is a known slow-close hinge assembly (or alternatively a conventional counterbalance hinge assembly), while a second one of the hinge assemblies H2 is a slow-open hinge assembly provided in accordance with an embodiment of the present development. In the illustrated embodiment where the first hinge assembly H1 is a slow-close hinge assembly, the first hinge assembly H1 can provide slow-close characteristics to the appliance door D while the second hinge assembly H2 configured in accordance with an embodiment of the present development provides slow-open characteristics to the appliance door D, whereby the first and second hinge assemblies H1, H2 cooperate to provide the oven door D with both slow close and slow open characteristics.

Figure 2A:
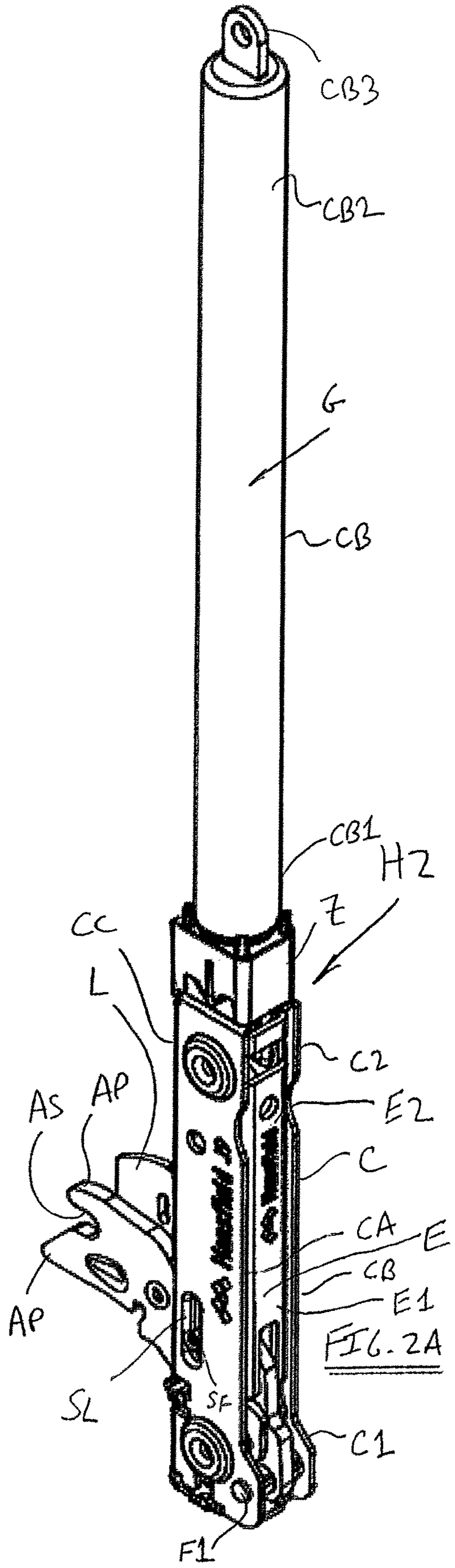
FIGS. 2A & 2B are respective left side and right side isometric views that show a slow open hinge assembly in accordance with an embodiment of the present development.
Figure 2B:
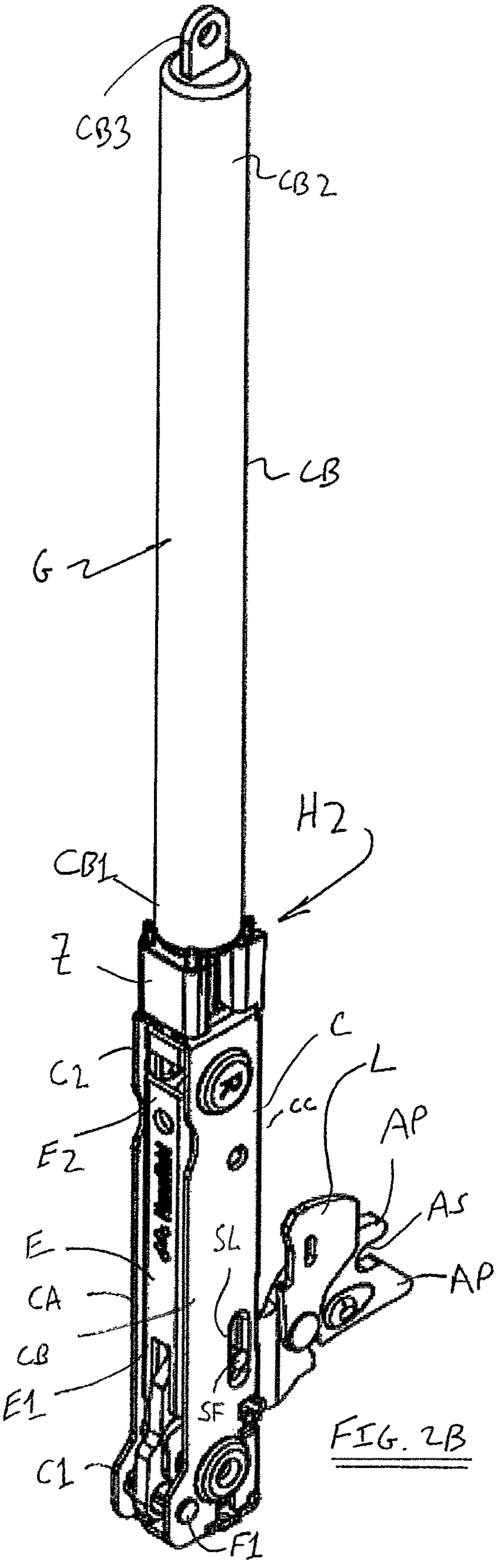

FIGS. 2A & 2B are respective left side and right side isometric views that show the second hinge assemblies H2 (sometimes generally referred to below as "hinge assembly H") that can be mated with an associated receiver RC (see FIGS. 1 & 3A-3D) that is connected to or formed as part of the appliance body B. The receiver RC includes an opening RO that is adapted to receive a hinge arm A of the hinge assembly H2, and the hinge arm A includes one or more slots AS and/or projections AP that mate with and/or abut one or more pins RP, walls, edges and/or other corresponding structures of the receiver RC to selectively releasably connect the hinge arm A to the receiver RC. The hinge assembly H further comprises a latch L that is pivotally or otherwise movably connected to the hinge arm A. The latch L is shown in its operative position in FIGS. 2A & 2B where the latch L lies adjacent and/or abuts a portion of the receiver R and/or the appliance body B to block and prevent or reduce vertical movement of the hinge arm A relative to the receiver RC as required to disconnect the hinge arm A from the receiver RC such that when the latch L is in its engaged position, the hinge arm A is captured to and is unable to be disconnected from the receiver RC. The latch L is selectively manually movable out of its operative position where it is moved away from the receiver RC so that the hinge arm A can be lifted or otherwise moved relative to the receiver RC as required to disengage the arm A from the receiver RC (see for example FIG. 9 that shows an install position of the latch L).

Figure 3A:
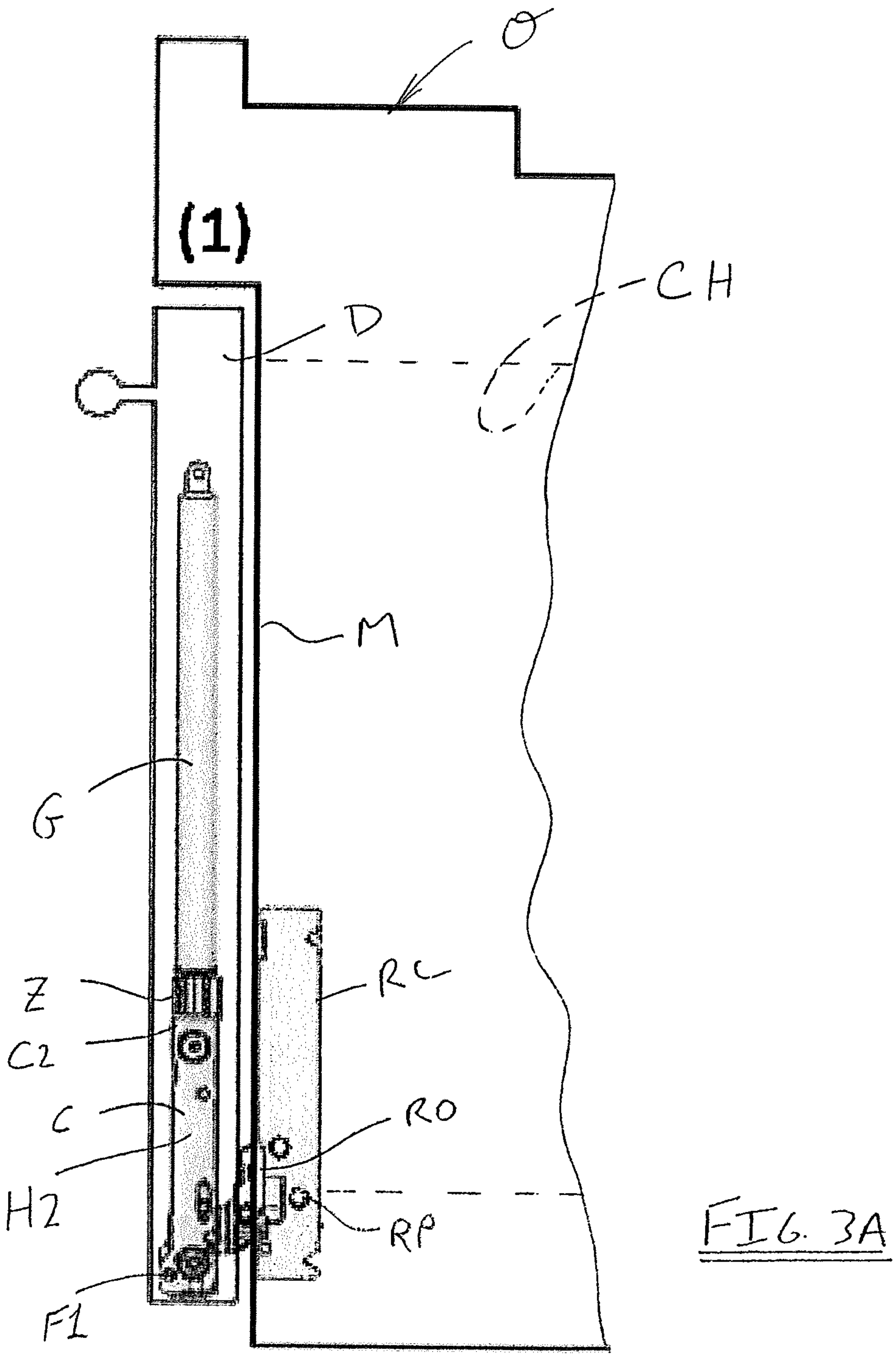
FIG. 3A is a partial side view of the oven of FIG. 1 that shows the appliance door and the second hinge assembly each in a first operative position corresponding to a closed position of the appliance door.
Figure 3B:
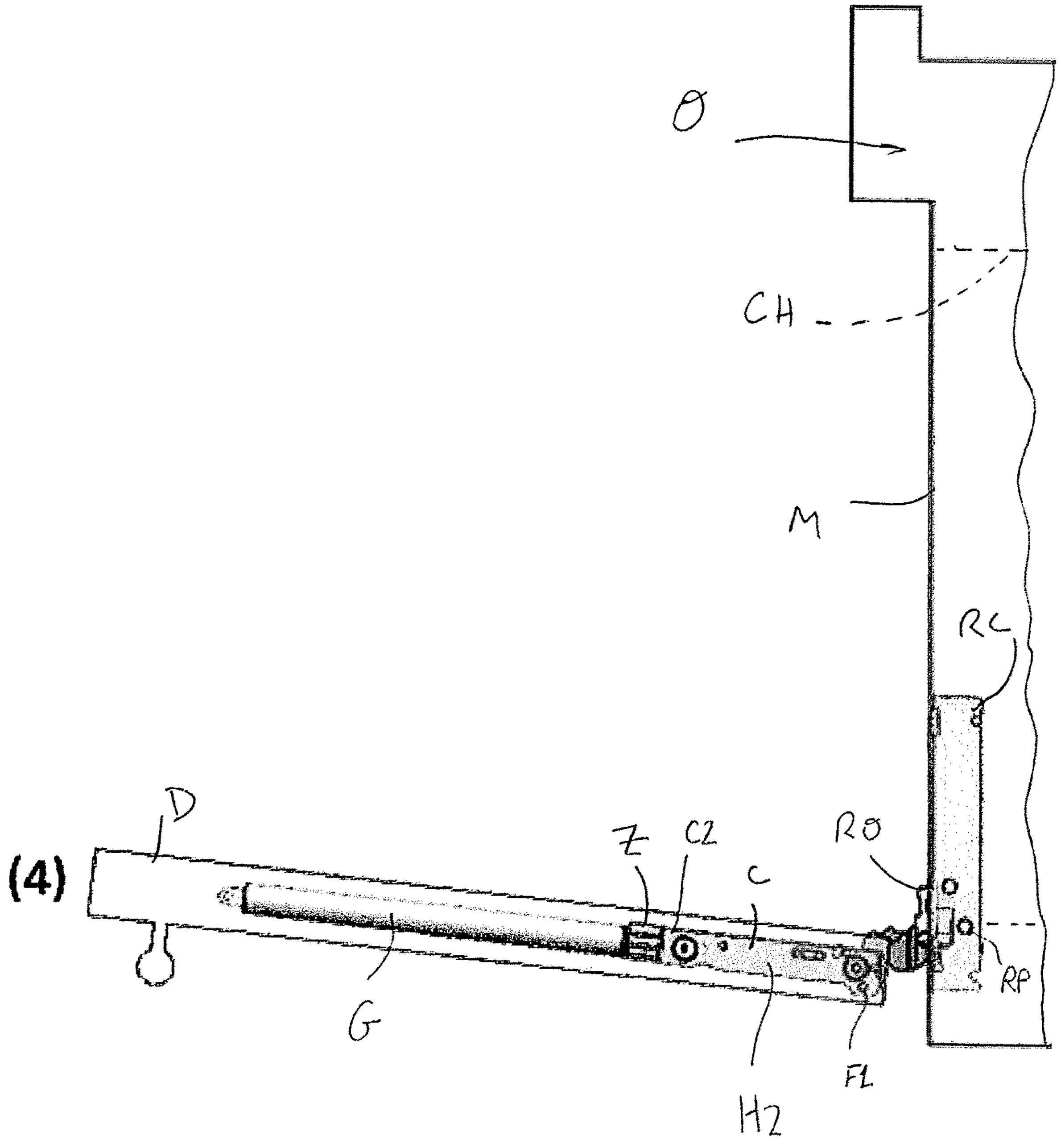
FIG. 3B is similar to FIG. 3A but shows the appliance door and the second hinge assembly each in a second operative position corresponding to a fully opened position of the appliance door.
Figure 3C:
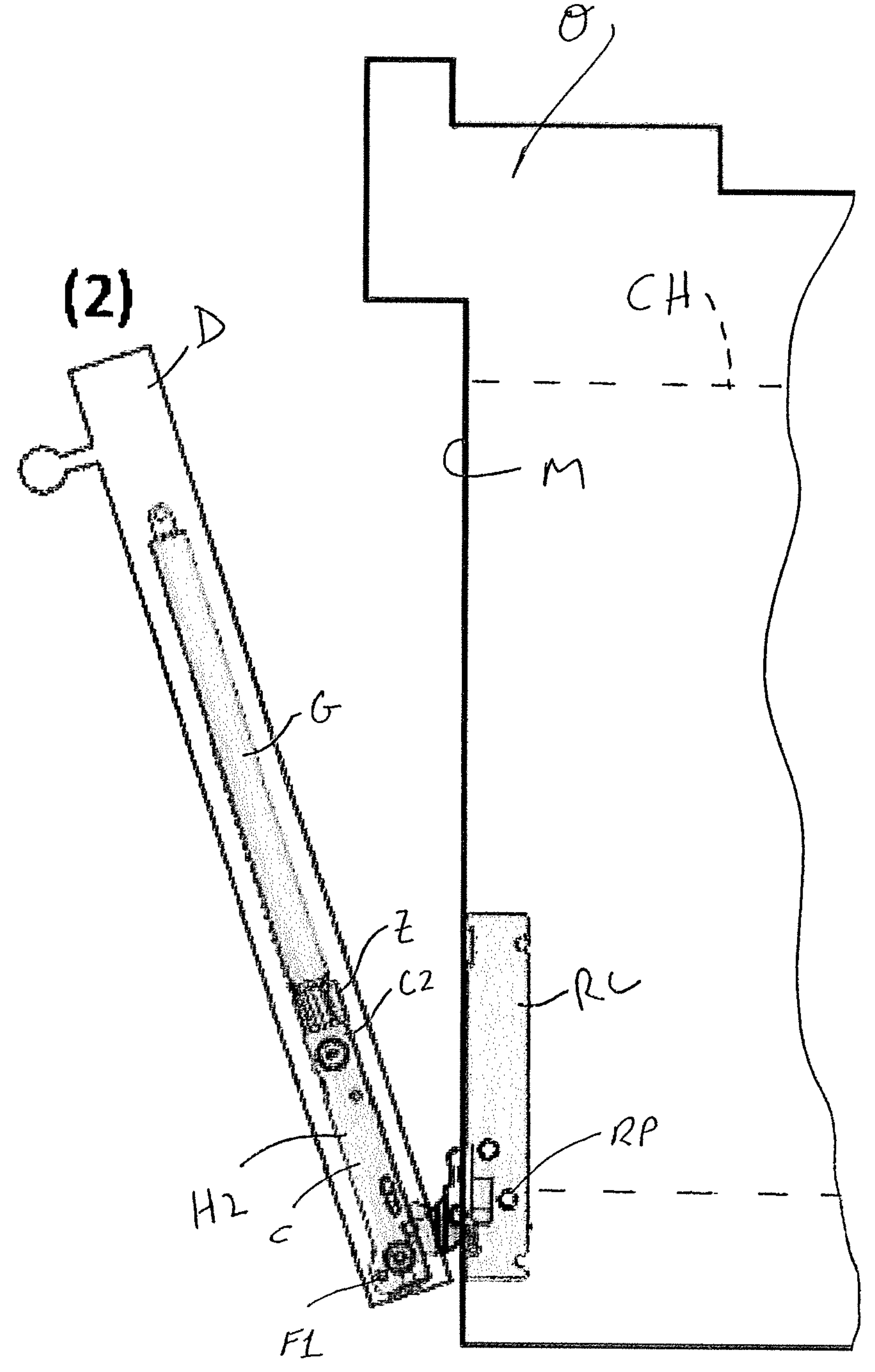
FIG. 3C is a side view that shows the appliance door and the second hinge assembly each in a slow close intermediate position.
Figure 3D:
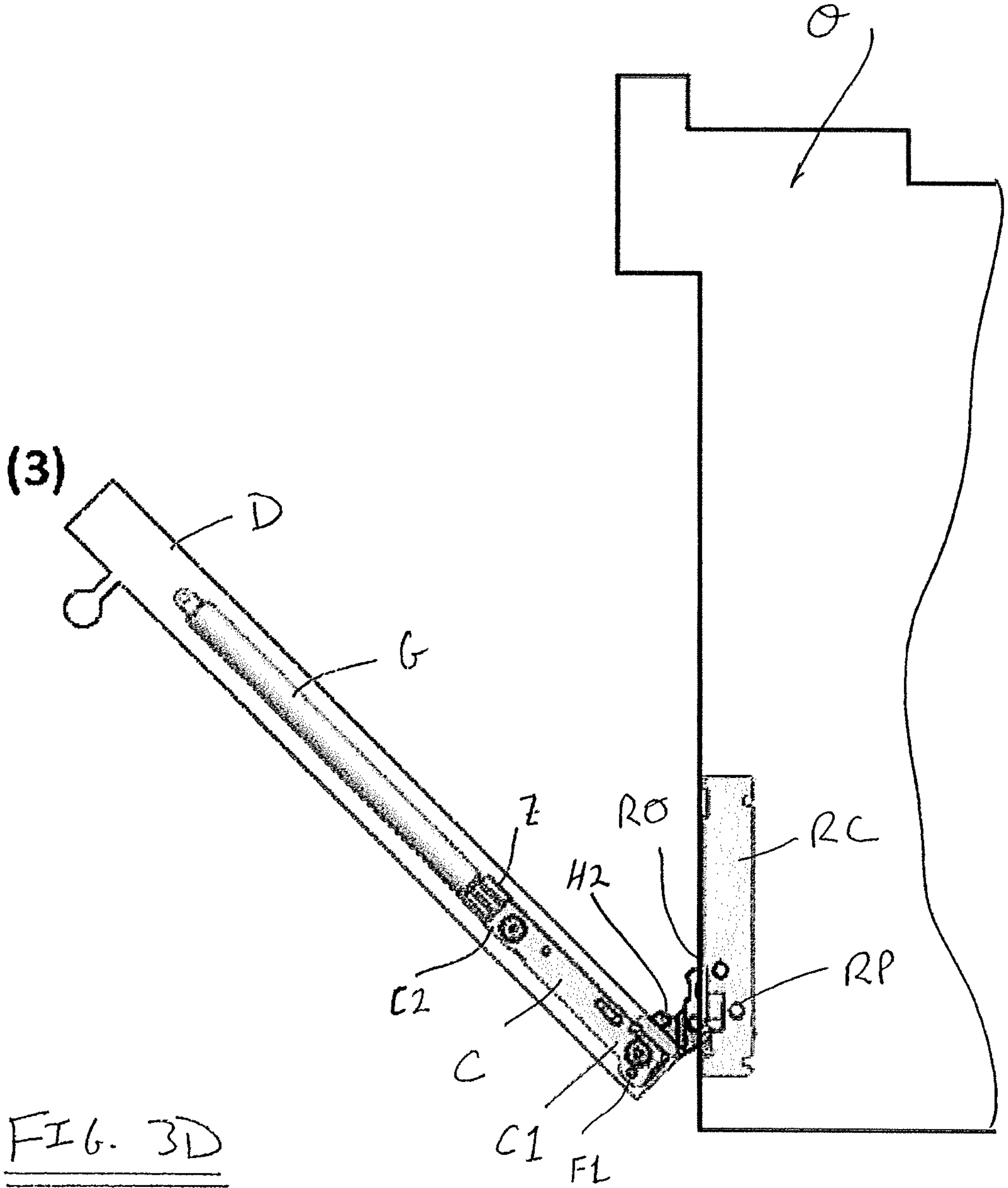
FIG. 3D is a side view that shows the appliance door and the second hinge assembly each in a slow open intermediate position.

FIG. 3A is a partial side view of the oven O of FIG. 1 that shows the appliance door D and the second hinge assembly H2 each in a first operative position corresponding to a closed position of the appliance door D where the appliance door D closes the cooking chamber mouth M. FIG. 3B is similar to FIG. 3A but shows the appliance door D and the second hinge assembly H2 each in a second operative position corresponding to a fully opened position of the appliance door D where the appliance door D is moved away from the mouth M of the cooking chamber CH to provide access into to the cooking chamber CH. FIG. 3C is a side view that shows the appliance door D and the second hinge assembly H2 each in a slow close intermediate position, while FIG. 3D is a side view that shows the appliance door D and the second hinge assembly H2 each in a slow open intermediate position. The slow close (or upper) intermediate position (FIG. 3C) is located between the slow open intermediate position (FIG. 3D) and the first operative (fully closed) position (FIG. 3A), while the slow open (or lower) intermediate position (FIG. 3D) is located between the slow close intermediate position (FIG. 3C) and the second operative (fully opened) position (FIG. 3B). In one example, the first and second hinge assemblies H1, H2 are configured such that the appliance door D will: (i) counterbalance at any angular position between the upper and lower intermediate positions; (ii) move to the first operative (door closed) position when located at the upper intermediate position or any position between the upper intermediate position and the first operative (closed) position; and (iii) move to the second operative (fully opened) position when located at the lower intermediate position or any position between the lower intermediate position and the second operative (fully opened) position. The exact angular location of the door D for each described position can be adjusted as desired.

Figure 4:
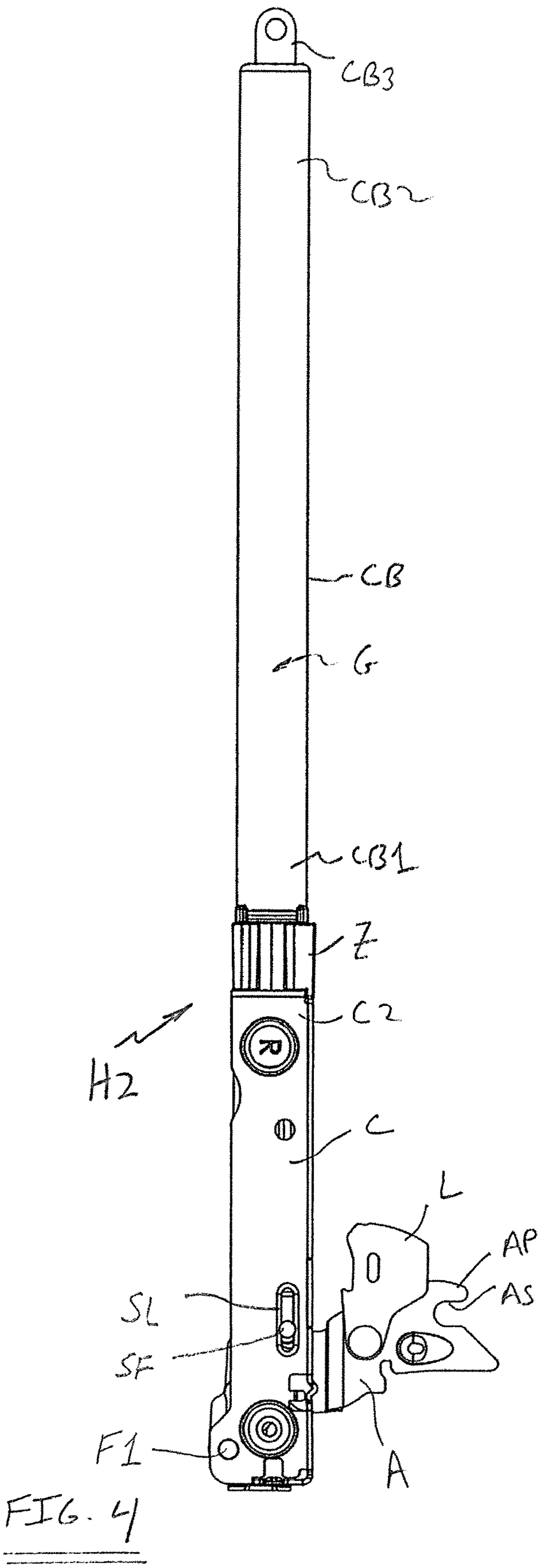
FIGS. 4 and 5 respectively provide right side and rear views of the slow open hinge assembly of FIGS. 2A and 2B in its first operative (door closed) position.
Figure 5:
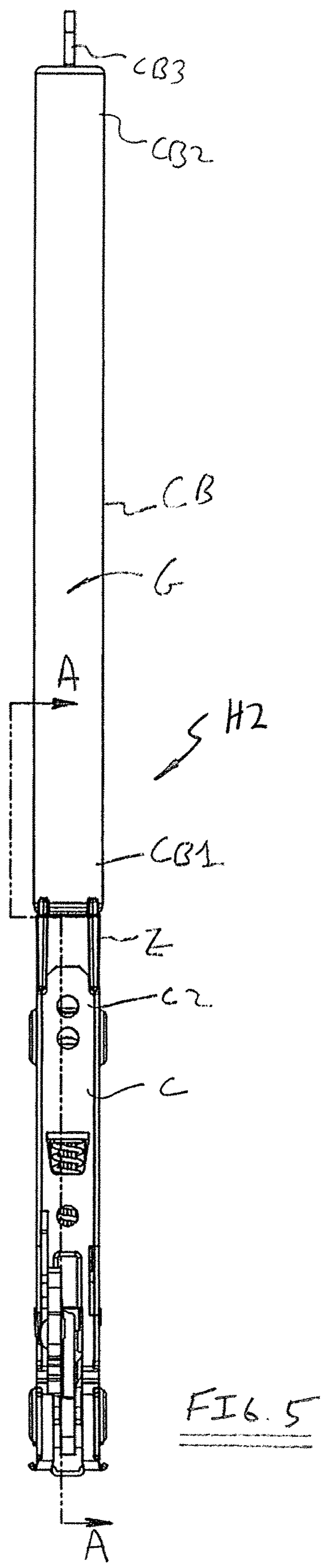
Figure 5A:
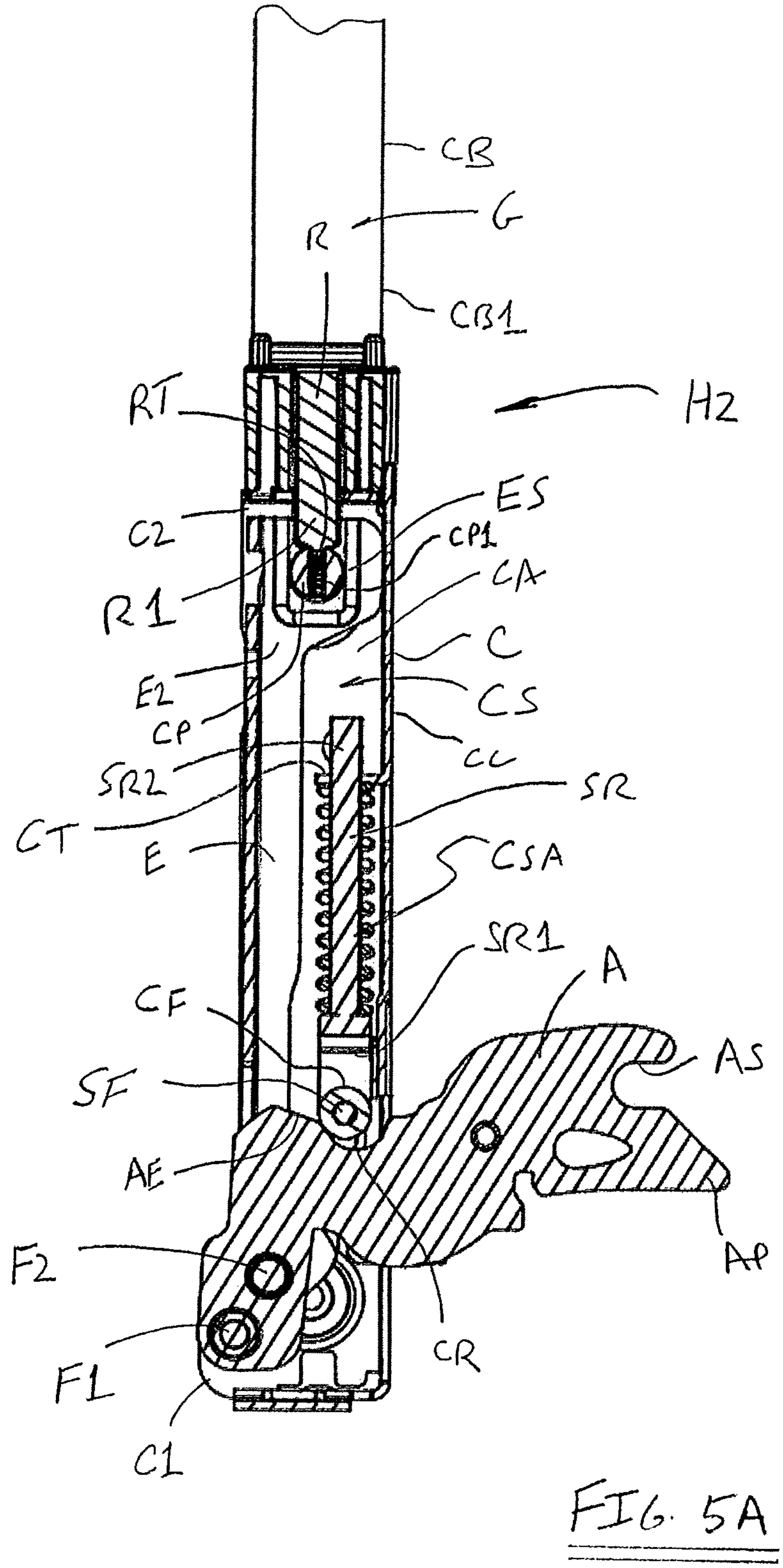
FIG. 5A is a partial section view taken at A-A of FIG. 5.
Figure 6:
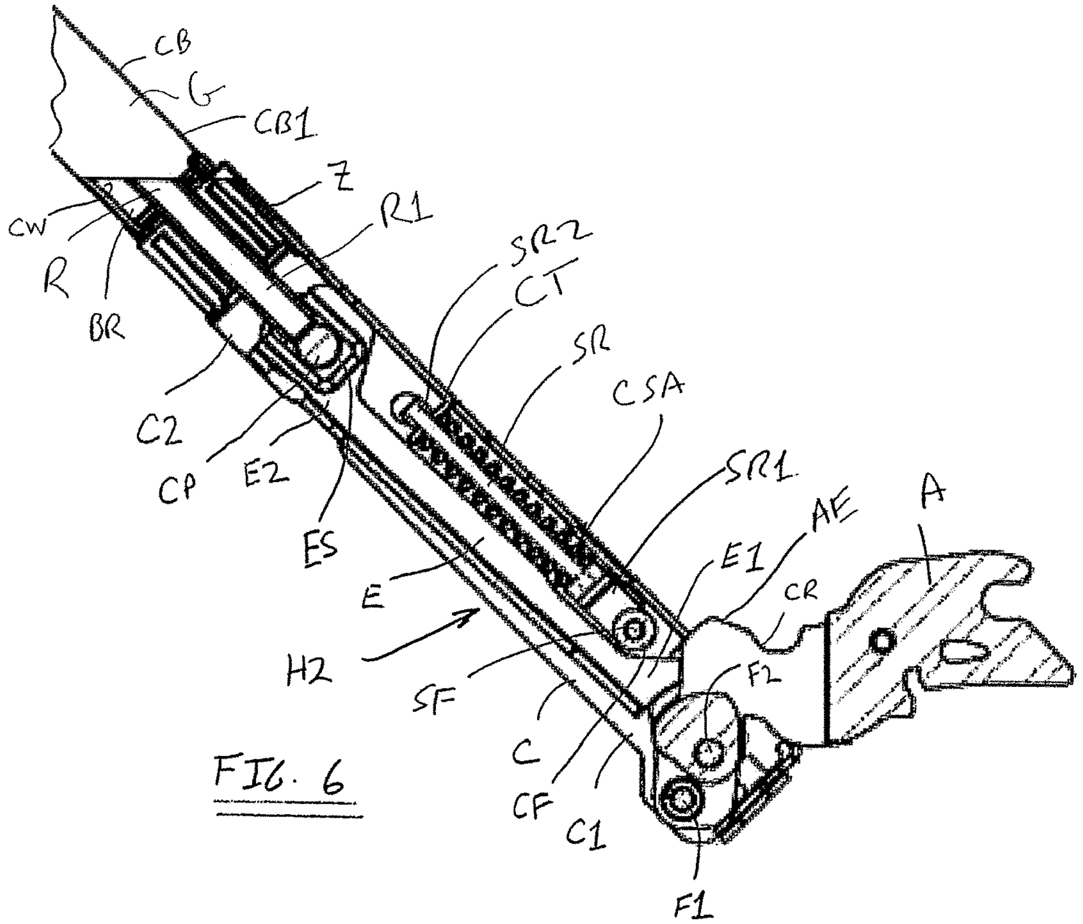
FIGS. 6 and 7 are similar to FIG. 5A but respectively show the hinge assembly in its lower intermediate position and its second operative (door fully opened) position.
Figure 7:
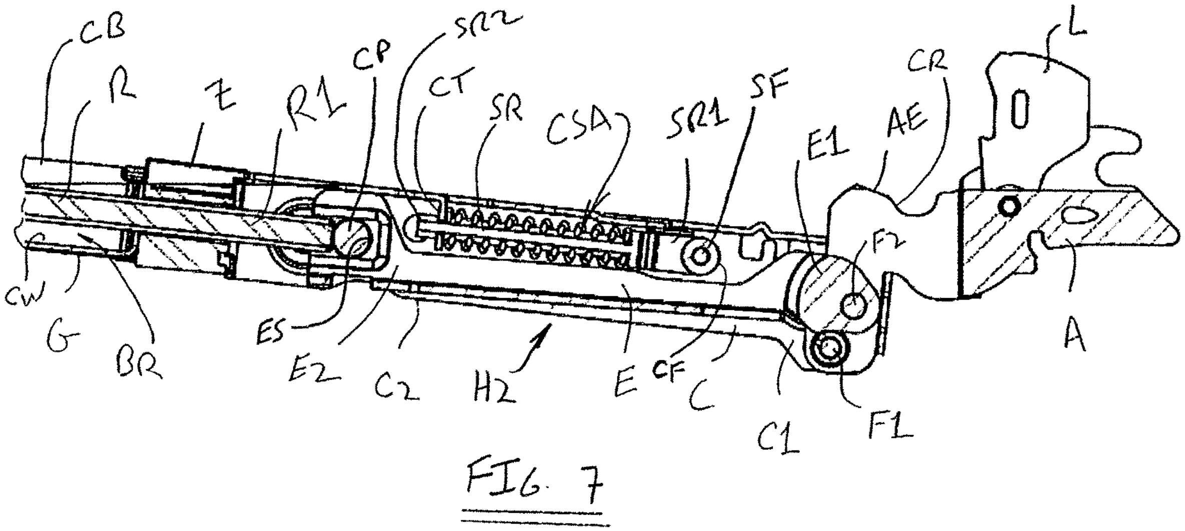

As noted, at least the second hinge assembly H2 can be provided as a slow open hinge assembly in accordance with an embodiment of the present development as shown in FIGS. 2A and 2B. FIGS. 4 and 5 respectively provide right side and rear views of the slow open hinge assembly H2 of FIGS. 2A and 2B in its first operative (door closed) position. FIG. 5A is a partial section view taken at A-A of FIG. 5. FIGS. 6 and 7 are similar to FIG. 5A but respectively show the hinge assembly H2 in its lower intermediate position and its second operative (door fully opened) position. As noted above, the illustrated example of a slow open hinge assembly H2 comprises a mounting arm A that is adapted to be engaged with an associated hinge receiver RC of the appliance body B for operatively and releasably connecting the hinge assembly H to the appliance body B. The mounting arm A includes one or more slots AS and/or projections AP that mate with and/or abut pins, walls, edges and/or other corresponding structures of the receiver RC to selectively releasably connect the mounting arm A to the receiver RC.

In addition to the mounting arm A, the slow open hinge assembly H2 further comprises a door mounting channel C pivotally connected at a first end or an inner end C1 thereof to the arm A by a rivet or other main pivot fastener F1 that defines the main pivot axis X. The door mounting channel C pivots about main pivot fastener F1 and the main pivot axis X between a first operative position (FIG. 3A) corresponding to the first operative (closed) position of the oven door D, and a second operative position (FIG. 3B) corresponding to the second operative (fully opened) position of the oven door D. Between its first and second operative positions, the door mounting channel C pivots through multiple intermediate operative positions such as the upper intermediate operative position shown in FIG. 3C and the lower intermediate position shown in FIG. 3D. The oven door D is connected to the door mounting channel C for pivoting movement therewith about the main pivot axis X relative to the mounting arm A. In the illustrated embodiment, the door mounting channel C can comprise a generally U-shaped channel structure provided by a metal stamping or other structure and comprises first and second spaced-apart parallel side walls CA, CB that are joined by a transverse end wall CC such that a space CS (FIG. 5A) is defined between the side walls CA, CB and the end wall CC. Opposite the first end C1, the door mounting channel C also includes a second end or outer end C2 that is spaced outwardly away from the inner end C1 and outwardly away from the main pivot axis X.

A slide body or slide link E is located adjacent the door mounting channel C, such as being located in the space CS defined between the channel walls CA, CB, CC. The slide link E includes a first or inner end E1 that is pivotally connected to the arm A by a rivet or other slide link pivot fastener F2 at a connection location that is offset or eccentrically spaced from the main pivot axis X defined by the main pivot fastener F1. The slide link pivot fastener F2 defines a secondary pivot axis about which the slide link E pivots relative to the mounting arm A, and the secondary pivot axis is parallel with but offset from the main pivot axis X. The slide link E further includes a second or outer end E2 spaced outwardly relative to the slide link inner end E1. The slide link pivot fastener F2 is located above or spaced outwardly from the main pivot fastener F1 when the channel C is located in its first operative (door-closed) position (FIG. 3A). The offset arrangement of the slide link pivot fastener F2 from the main pivot fastener F1 causes, induces, and/or results in relative sliding movement of the slide link E relative to the channel C between the inner and outer ends C1, C2 of the channel C when the channel C and slide body E are pivoted simultaneously about their respective pivot fasteners F1, F2 as can be seen in comparing FIGS. 6 and 7. The slide link E is shown as a single one-piece metallic structure, but it can alternatively be constructed from a polymeric and/or other material and can alternatively be comprised of two or more interconnected links or members. As shown in FIG. 7, when the hinge assembly H2 is arranged in its second operative (door fully opened) position, the inner end E1 of the slide link E can abut the main pivot fastener F1 such that the main pivot fastener F1 prevents further pivoting movement of the slide link E about the slide link pivot fastener F2 in the opening direction OD which also prevents further pivoting movement of the channel C about the main pivot fastener F1 in the opening direction OD such that the contact between the slide link E and the main pivot fastener F1 provides a stop mechanism and stop position that defines the second operative (door fully opened) position for the hinge assembly H2.

The hinge assembly H further comprises a biasing system for continuously urging the door mounting channel C toward its first operative (door-closed) position. In the illustrated embodiment, the biasing system comprises a fluid-damped spring rod assembly G that is operably engaged between the door mounting channel C and the slide link E. The spring rod assembly G is located outwardly from the outer end C2 of the channel C with a rod R thereof connected directly or indirectly to the slide link E such as by being connected to the outer end E2 of the slide link E as shown. The rod R includes an outer end or first end R1 that projects outwardly from the cylinder body first end CB1 and that is operably connected directly or indirectly to the slide link E. In one non-limiting example, the rod first end R1 is operably connected to or engaged with the slide link E through a cross-pin CP (see FIG. 5A) that is slidably engaged with the second end E2 of the slide link E, such as by being received into a slot ES or other receiving location defined by the slide link E. The cross-pin CP can move somewhat relative to the slide link E in all directions within the slot ES to accommodate misalignment and changes in alignment between the slide link E and the channel C and/or rod R as the hinge assembly H2 operates. The first end R1 of the rod R is connected to the cross-pin CP so as to be operably engaged with the slide link E. In a non-limiting example, the rod first end R1 includes an externally threaded tip RT that is threaded into a mating threaded bore CP1 defined in the cross-pin CP, but other connection structures and arrangements can be used. This connection of the rod R to the cross-pin CP can be used to secure the cylinder body CB to the channel C, with or without the optional spacer Z.

In the illustrated example, spring rod assembly G includes a cylinder body CB connected directly or indirectly to or otherwise supported on the door mounting channel C to move therewith. The cylinder body CB includes a first end CB1 that is oriented toward the door mounting channel C and from which the rod R extends. The first end CB1 of the cylinder body CB can be abutted directly with the outer end C2 of the door mounting channel C or, as shown in the present example, an adapter or spacer Z can be provided between the first end CB1 of the cylinder body CB and the outer end C2 of the channel C to provide a more stable seat or base for the cylinder body CB to be engaged with the cylinder body CB and/or to control the minimum distance by which the rod R will extend outwardly from the first end CB1 of the cylinder body CB when the spring rod assembly G is operably installed and the hinge assembly H2 is located in its first operative (door closed) position. The spacer Z can be one-piece or multi-piece and can be a metallic component such as a stamped component or a die-cast (e.g., zinc) component, although other materials such as certain high-temperature polymeric materials can be used. As noted, the spacer Z is optional and can be omitted in which case the first end CB1 of the cylinder body CB can be abutted with the outer end C2 of the channel C.

Figure 8:
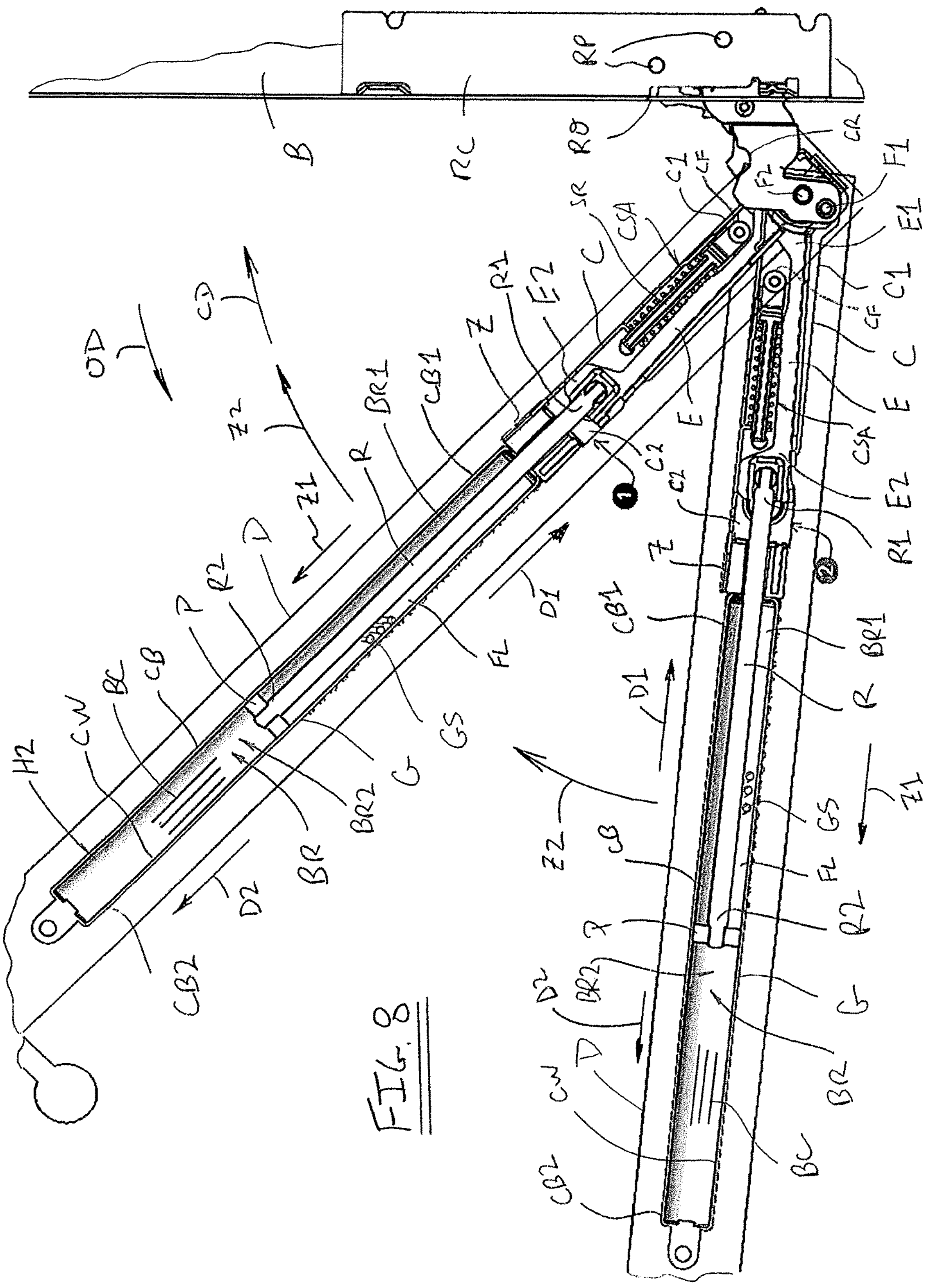
FIG. 8 shows the oven door in both the lower intermediate position and also in the second operative (fully opened) position.

FIG. 8 shows the oven door D in both the lower intermediate position and also in the second operative (fully opened) position. The fluid-damped spring rod assembly G in more detail and comprises a piston P located in a cylinder bore BR of the body CB and adapted for reciprocal sliding movement between the first end CB1 of the cylinder body CB and an opposite outer end CB2 of the cylinder body CB. As noted above, the rod R includes a first end R1 operably connected to the slide link E and an opposite inner end or second end R2. The rod second end R2 is connected to the piston P to form a piston rod assembly, and the rod R extends from the piston P coaxially through the cylinder bore BR and outwardly through the body first end CB1 such that the rod first end R1 projects outwardly away from the body first end CB1. The projecting first end R1 of the rod R is connected directly or indirectly to the slide link E (such as to the outer end E2 of the slide link E). A return spring GS (only partially shown) is located in the cylinder bore BR and coaxially positioned about the rod R and is operatively engaged between the piston P and the first end CB1 or other part of the cylinder body CB such that the return spring GS biases or urges the piston P away from the body first end CB1 toward the body second end CB2 so that the piston rod R is normally retracted relative to the cylinder body CB. Oil or another liquid or gaseous (e.g., nitrogen) damping fluid FL is located in the cylinder bore BR and damps movement of the piston P at least for a portion of the extension movement of the piston in a first (extension) direction D1 toward the cylinder body first end CB1 corresponding to extension of the rod R from the cylinder body CB. The piston P can be configured to provide for less restricted or unrestricted flow of damping fluid through and/or around the piston P when the piston P moves in the opposite second (retraction) direction D2 corresponding to retraction movement of the piston P and rod R toward the opposite second end CB2 of the cylinder body CB such that the hinge assembly H2 provides less damping or no damping when the channel C is moving in the door closing direction CD when the oven door D is being closed.

With continuing reference to FIG. 8, in the illustrated embodiment, the cylinder bore BR can include a first or inner portion BR1 and a second or outer portion BR2. The cylinder bore first portion BR1 is located closer to the cylinder body first end CB1 as compared to the cylinder bore second portion BR2, and the cylinder bore second portion BR2 is located closer to the cylinder body second end CB2 as compared to the cylinder bore first portion BR1. The outer portion BR2 of the cylinder bore BR is configured such that the inner wall CW of the cylinder body CB defining the bore outer portion BR2 includes one or more fluid bypass passages or channels BC defined therein so that the oil or other damping fluid FL can bypass the piston P (move between the piston P and the cylinder body inner wall CW) when the piston P is axially located in the outer portion BR2 of the bore BR. This ensures that movement of the piston P in the outer portion BR2 of the cylinder bore BR is completely or substantially undamped in both the direction D1 and also in the opposite direction D2. In other words, when the piston P is located in the cylinder bore outer portion BR2, the damping fluid FL bypasses the piston P to allow undamped or at least substantially undamped movement of the piston P in the bore outer portion BR2 in either the first or second directions D1, D2. In one non-limiting example, the location of the cylinder bore outer portion BR2 is configured such that the piston P will be axially located in the cylinder bore outer portion BR2 for all angular positions of the door mounting channel C relative to the arm A, except when the hinge assembly H2 is located inclusively between its lower intermediate position (FIG. 3D) and the second operative (door fully opened) position (FIG. 3B) such that the damping fluid FL in the bore BR of the spring rod assembly G has a reduced effect on movement of the door mounting channel C except when the oven door D is being opened and is located inclusively between the lower intermediate position (FIG. 3D) and the second operative (door fully opened) position (FIG. 3B). In one non-limiting example, the lower intermediate position (FIG. 3D) corresponds to a location where the channel C is pivoted to a position located between 45-55 degrees from its first operative (door closed) position.

The return spring GS exerts a retraction biasing force Z1 on the piston P that urges the piston P in the retraction direction D2 away from the body first end CB1 toward the body second end CB2 such that the rod R is biased toward its retracted position where the rod R is withdrawn into the cylinder bore BR except for its first end R1. Due to the offset arrangement of the first and second pivot fasteners F1, F2 as described, the retraction biasing force Z1 exerted on the piston P and rod R induces a door closing moment Z2 in the door mounting channel C that urges or biases the channel C in a closing direction CD toward the first operative (door-closed) position.

Figure 9:
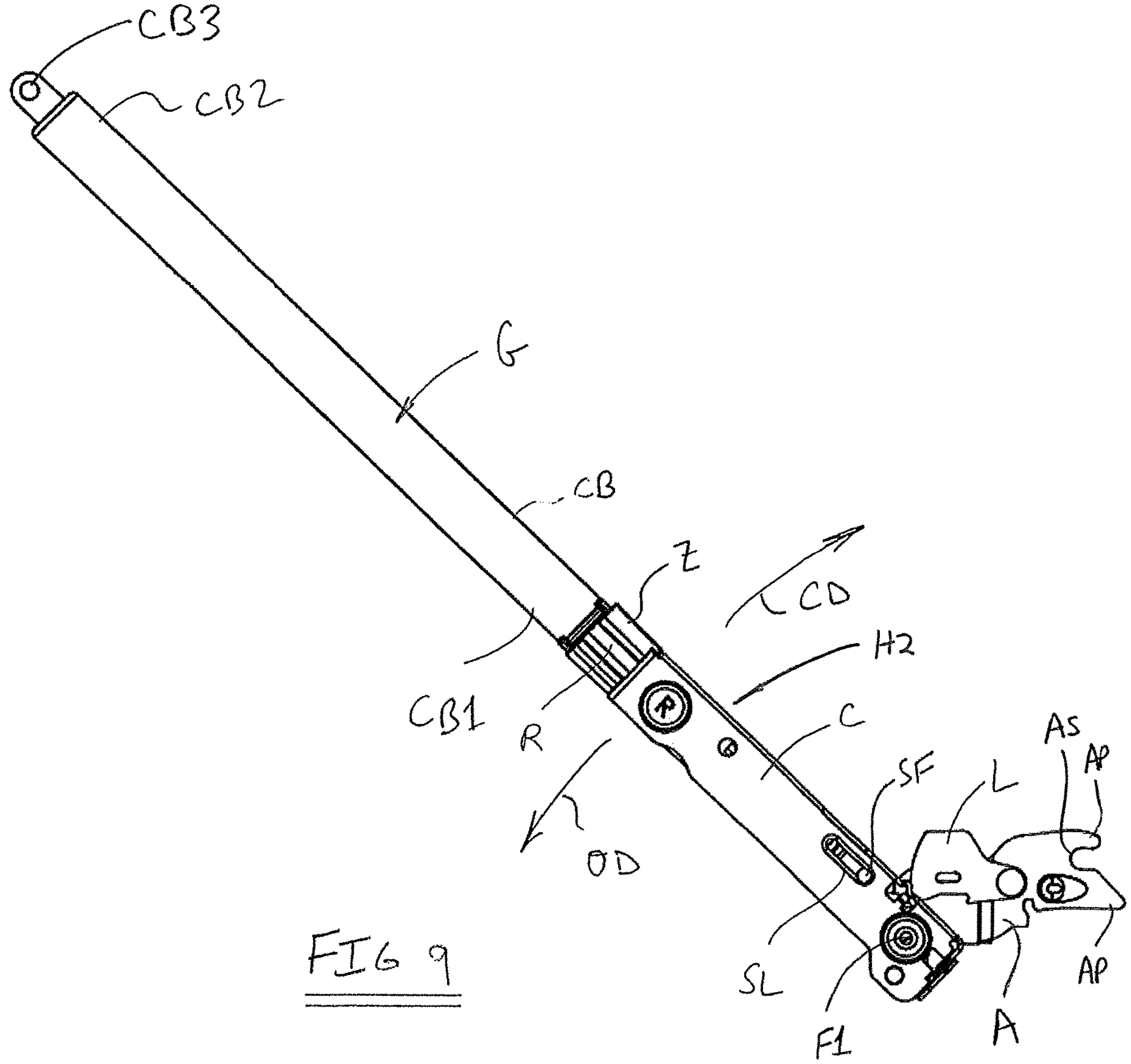
FIG. 9 is a side view that shows the hinge assembly arranged in its installation configuration.

To facilitate installation of the hinge assembly H2 into the receptacle RC and to facilitate removal of the hinge assembly H2 from the receptacle, the latch L can be selectively pivoted to an installation position as shown in FIG. 9, where the latch L engages the door mounting channel C and/or slide link E and blocks pivoting movement of the door mounting channel C in the door closing direction CD under force of the return spring GS. The second/outer end CB2 of the cylinder body CB can optionally include a hook, eye, or other connector structure CB3 that provides a connection point that can be used during assembly and/or handling to engage and retain the cylinder body CB as required to position the hinge H2 in a select configuration such as its installation configuration shown in FIG. 8.

Pivoting movement of the door mounting channel C in a door-opening direction OD from its first operative position (FIGS. 3A, 4) or another position toward its second operative position (FIGS. 3B, 7) against the biasing force Z1 of the return spring GS causes the slide link E to slide inwardly relative to the door mounting channel C away from the second end C2 of the channel C toward the first (inner) end C1 of the channel C and thus pull the rod R of the spring rod assembly G inwardly toward the first end C1 of the channel C, which causes the return spring GS to be resiliently compressed. On the other hand, when the door mounting channel C is moved in the opposite door-closing direction CD from its second operative position (FIGS. 3B, 7) or another position toward the first operative position (FIGS. 3A, 4), the return spring GS resiliently elongates to urge the piston P toward the second (outer) end CB2 of the cylinder body CB and thus retract the rod R into the bore BR, and the slide link E slides outwardly relative to the door mounting channel C toward the second (outer) end C2 of the door mounting channel C to urge the channel C and oven door D toward the first (closed) position to assist with closing the oven door D.

The hinge assembly H can further include a control spring assembly CSA connected to the door mounting channel C for controlling angular movement of the channel C in the opening and closing directions OD, CD. The control spring assembly CSA includes a control spring rod SR with that is mounted for reciprocal sliding movement on and relative to the channel C. In one example as shown, the channel C can include a tab CT that includes an aperture through which an outer end SR2 of the spring rod extends. An opposite inner end SR1 of the spring rod SR is slidably connected to the channel C by a slide fastener SF such as a rivet or other fastener that extends between the opposite first and second walls CA, CB of the channel C with the first and second opposite ends of the slide fastener SF seated respectively in first and second matching, aligned or registered elongated slots SL formed respectively in the first and second channel side walls CA, CB (see also FIGS. 2A, 2B).

A cam follower CF such as the illustrated roller or a bushing is connected to and/or formed as part of the inner end SR1 of the spring rod by the slide fastener SF or otherwise (or the slide fastener SF or spring rod inner end SR1 can provide the cam follower CF) and is adapted to move linearly and reciprocally in the first and second opposite directions D1, D2 as limited by the length of the elongated slots SL defined in the first and second side walls CA, CB of the channel C. The hinge mounting arm A for mating with the oven body receptacle RC includes a contoured upper edge AE that defines a cam profile that is engaged by the roller or other cam follower CF when the hinge assembly H2 (channel C) is located in or between its first operative (door closed) position and its upper intermediate position (FIG. 3C) such that the engagement of the cam follower CF on the cam profile defined by the arm contoured edge AE controls or influences movement of the channel C as the channel C moves in the closing direction CD toward the first operative (door closed) position or in the opening direction OD away from the first operative (door closed) position. Furthermore, the cam profile defined by the mounting arm contoured edge AE can include a closing recess CR that is dimensioned and conformed such that engagement of the roller or other cam follower CF with an inclined portion of the closing recess CR induces a closing force or closing moment in the channel C in the closing direction CD toward its first operative (door closed) position to ensure that the appliance door D is firmly held in and urged toward its closed position.

As shown in FIGS. 6-8, the roller or other cam follower CF is separated from the cam profile defined by contoured edge AE of the mounting arm A when the door D and hinge assembly H2 and channel C are positioned between the upper intermediate position (FIG. 3C) and the second operative (door fully opened) position (FIG. 3B) such that the control spring assembly CSA has no effect on angular movement of the door mounting channel C about the primary pivot axis X except when the door D and hinge assembly H2 are positioned inclusively between the upper intermediate position (FIG. 3C) and the first operative (door closed) position (FIG. 3A).

Figure 10:
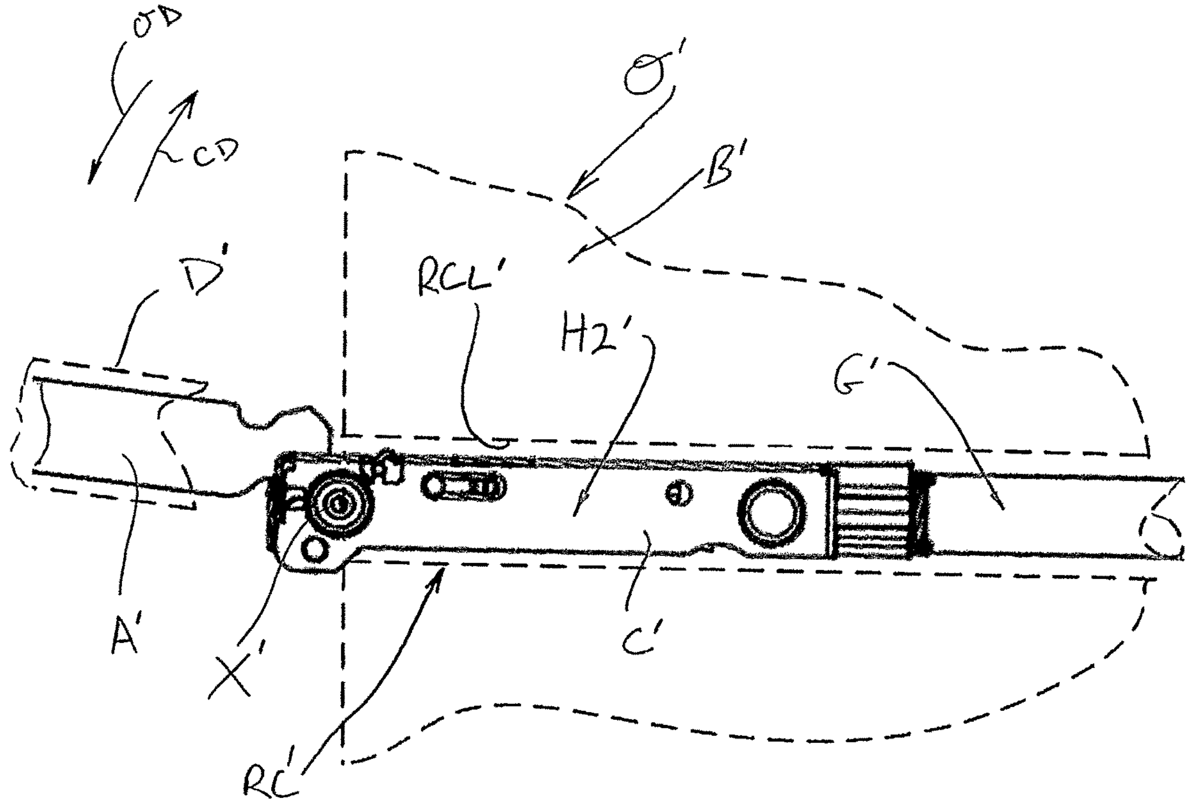
FIG. 10 shows an alternative embodiment of an oven or other appliance including a soft open hinge assembly hinge assembly according to an embodiment of the present development.

FIG. 10 shows a hinge assembly H2' that is similar to the hinge assembly H2 except as otherwise shown and/or described herein. Components of the hinge assembly H2' and appliance O' of FIG. 10 that correspond to components of the hinge assembly H2 and oven O are identified with like reference identifiers that include a primed (') designation. As shown in FIG. 10, the receiver RC described above is replaced by a receiver RC' comprising a receiver slot RCL' defined in and/or connected to the body B' of an oven O'. The orientation of the hinge assembly H2' can be reversed as compared to the hinge assembly H2 such that the channel C' and the fluid-damped spring rod assembly G' are received into the receiving slot RCL', and the arm A is replaced by a modified arm A' that remains accessible external to the oven body B' and that pivots about the primary pivot axis X' in the opening and closing directions OD, CD. The arm A' is adapted to be engaged by and connected to the door D' such that the door D' moves together with the arm A' as the arm A' pivots about the primary pivot axis X' relative to the channel C.

The development has been described with reference to preferred embodiments. Modifications and alterations will occur to those of ordinary skill in the art to which the invention pertains, and it is intended that the claims be construed as broadly as possible while maintaining their validity in order to encompass all such modifications and alterations.

The invention claimed is:

1. A slow open hinge assembly for an associated appliance door, said slow open hinge assembly including an arm, a channel comprising a first end that is pivotally connected at the first end to the arm at a first location by a main pivot fastener for pivoting about a first pivot axis, a slide link including an inner end that is pivotally connected to the arm at a second location for pivoting about a second pivot axis that is offset from the first pivot axis, a fluid damped spring rod assembly including a cylinder body supported on the channel and comprising a spring-biased piston rod assembly engaged with the slide link, wherein said inner end of said slide link is pivotally connected to said arm at said second location by a slide link pivot fastener and wherein an outer end of said slide link is connected to said piston rod assembly by a cross-pin engaged with an outer end of a piston rod of said piston rod assembly, wherein said outer end of said slide link comprises a slot in which said cross-pin is located, wherein said cross-pin is configured to move within the slot to accommodate misalignment between the outer end of the slide link and the piston rod.

2. The slow open hinge assembly for an associated appliance door as set forth in claim 1, further comprising a control spring assembly connected to said channel and comprising a reciprocally movable spring rod assembly including a follower, wherein said follower is engaged with a cam profile defined by a contoured edge of the arm for some but not all angular positions of said channel relative to said arm.

3. The slow open hinge assembly as set forth in claim 2, wherein said channel comprises first and second spaced-apart side walls and said slide link is located in a space between the first and second side walls.

4. The slow open hinge assembly as set forth in claim 3, wherein slide link contacts said main pivot fastener such that said main pivot fastener acts as a stop and blocks pivoting movement of the slide link and channel in an opening direction when said channel is pivoted in said opening direction to a second position that corresponds to an opened position of the associated appliance door.

5. The slow open hinge assembly as set forth in claim 4, wherein said fluid damped spring rod assembly comprises the cylinder body comprising a cylinder bore and further comprises a piston slidably located in said cylinder bore, wherein an inner end of said piston rod is connected to said piston and said outer end of said piston rod projects outwardly from a first end of said cylinder body and is connected to said outer end of said slide link.

6. The slow open hinge assembly as set forth in claim 5, wherein said cylinder body is connected to an outer end of said channel.

7. The slow open hinge assembly as set forth in claim 6, wherein said first end of said cylinder body is abutted with said outer end of said channel.

8. The slow open hinge assembly as set forth in claim 6, further comprising a spacer located between said first end of said cylinder body and said outer end of said channel.

9. The slow open hinge assembly as set forth in claim 8, wherein said cylinder bore comprises a first portion and a second portion, wherein said first portion is located closer to said cylinder body first end as compared to said second portion, and wherein said second portion of said cylinder bore comprises one or more fluid bypass passages by which damping fluid in said cylinder bore can bypass the piston when the piston is located in the second portion of the bore.

10. A hinge assembly for an associated appliance door, said hinge assembly comprising:

an arm;

a channel comprising an inner end pivotally connected to the arm at a first pivot location by a first pivot fastener and an outer end spaced from said inner end, said channel and arm adapted to pivot relative to each other about a first pivot axis between a first position that corresponds to a closed position of the associated appliance door and a second position that corresponds to an opened position of the associated appliance door, wherein said channel and arm pivot relative to each other through upper and lower intermediate positions located between the first and second positions when the channel and arm pivot between the first and second positions;

a slide link located adjacent the channel and comprising a slide link inner end and a slide link outer end spaced from said slide link inner end, said slide link inner end pivotally connected to the arm at a second pivot location by a second pivot fastener that is offset from said first pivot axis such that relative pivoting movement between said channel and said arm about said first pivot axis results in: (i) pivoting movement of the slide link about a second pivot axis that is offset from said first pivot axis; and (ii) sliding movement of the slide link relative to the channel;

a fluid damped spring rod assembly operably engaged with said channel and comprising a spring-biased piston rod assembly operably engaged with said slide link, wherein said fluid damped spring rod assembly damps movement of said channel from said lower intermediate position toward said second position;

wherein said inner end of said slide link is pivotally connected to said arm at said second pivot location by said second pivot fastener and wherein the outer end of said slide link is connected to said piston rod assembly by a cross-pin engaged with an outer end of a piston rod of said piston rod assembly:

wherein said outer end of said slide link comprises a slot in which said cross-pin is located, wherein said cross-pin is configured to move within the slot to accommodate misalignment between the outer end of the slide link and the piston rod.

11. The hinge assembly as set forth in claim 10, further comprising a control spring assembly connected to said channel and comprising a reciprocally movable control spring rod assembly including a spring rod and a follower, wherein said follower is engaged with a cam profile defined by a contoured edge of the arm for some but not all angular positions of said channel relative to said arm.

12. The hinge assembly as set forth in claim 11, wherein said channel comprises first and second spaced-apart side walls and said slide link is located in a space between the first and second side walls.

13. The hinge assembly as set forth in claim 11, wherein said slide link contacts said first pivot fastener when said channel is pivoted in an opening direction from said first position to said second position such that said first pivot fastener acts as a stop and blocks pivoting movement of the slide link and the channel in the opening direction.

14. The hinge assembly as set forth in claim 10, wherein said fluid damped spring rod assembly comprises a cylinder body comprising a cylinder bore and further comprises a piston slidably located in said cylinder bore, wherein an inner end of said piston rod is connected to said piston and said outer end of said piston rod projects outwardly from a first end of said cylinder body and is connected to said slide link.

15. The hinge assembly as set forth in claim 14, wherein said cylinder body is connected to an outer end of said channel.

16. The hinge assembly as set forth in claim 15, wherein said first end of said cylinder body is one of: (i) abutted with said outer end of said channel; (ii) engaged with a spacer that is engaged with said outer end of said channel.

17. The hinge assembly as set forth in claim 14, wherein said cylinder bore comprises a first portion and a second portion, wherein said first portion is located closer to said cylinder body first end as compared to said second portion, and wherein said second portion of said cylinder bore comprises one or more fluid bypass passages by which damping fluid in said cylinder bore can bypass the piston when the piston is located in the second portion of the bore.

18. The hinge assembly as set forth in claim 12, wherein:

the channel comprises a tab that includes an aperture through which an outer end of the spring rod extends;

an inner end of the spring rod is slidably connected to the channel by a slide fastener that extends between the opposite first and second side walls of the channel and that includes opposite first and second ends that are slidably located in first and second elongated slots formed in the first and second side walls, respectively.

* * * * *